United States Patent
Akahira et al.

[11] Patent Number: 5,847,723
[45] Date of Patent: Dec. 8, 1998

[54] INK-JET PRINTING METHOD AND APPARATUS, AND METHOD AND APPARATUS FOR MANUFACTURING COLOR FILTER

[75] Inventors: Makoto Akahira; Hiromitsu Yamaguchi, both of Kawasaki, Japan

[73] Assignee: Canon Kabushiki Kaisha, Tokyo, Japan

[21] Appl. No.: 706,555

[22] Filed: Sep. 5, 1996

[30] Foreign Application Priority Data

Sep. 8, 1995 [JP] Japan ................................ 7-231219
Aug. 29, 1996 [JP] Japan ................................ 8-228506

[51] Int. Cl.⁶ ........................................................ B41J 2/02
[52] U.S. Cl. ............................ 347/14; 347/105; 347/15; 347/43
[58] Field of Search .......................... 347/12.6, 13, 14, 347/15, 42, 43, 57, 104, 105

[56] References Cited

U.S. PATENT DOCUMENTS

| | | | |
|---|---|---|---|
| 4,216,480 | 8/1980 | Buehner et al. | 347/14 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,631,548 | 12/1986 | Millbrandt | 347/15 |
| 4,723,129 | 2/1988 | Endo et al. | 346/1.1 |
| 4,740,796 | 4/1988 | Endo et al. | 346/1.1 |
| 4,743,127 | 5/1988 | Uematsu | 400/54 |
| 5,389,956 | 2/1995 | Hadimioglu et al. | 347/12 |
| 5,412,410 | 5/1995 | Rezanka | 347/15 |
| 5,593,757 | 1/1997 | Kashiwazaki et al. | 347/106 |

FOREIGN PATENT DOCUMENTS

| | | |
|---|---|---|
| 0 013 296 | 7/1980 | European Pat. Off. . |
| 0 076 948 | 4/1983 | European Pat. Off. . |
| 0 044 492 | 8/1991 | European Pat. Off. . |
| 0 440 490 | 8/1991 | European Pat. Off. . |
| 0 461 938 | 12/1991 | European Pat. Off. . |
| 54-056847 | 5/1979 | Japan . |
| 59-75205 | 4/1984 | Japan . |
| 59-123670 | 7/1984 | Japan . |
| 59-138461 | 8/1984 | Japan . |
| 60-071260 | 4/1985 | Japan . |
| 63-235901 | 9/1988 | Japan . |
| 63-294503 | 12/1988 | Japan . |
| 1-217320 | 8/1989 | Japan . |

*Primary Examiner*—Christopher A. Bennett
*Attorney, Agent, or Firm*—Fitzpatrick, Cella, Harper & Scinto

[57] ABSTRACT

This invention has as its object to provide an ink-jet printing method which make uniform the ejection amounts of nozzles with high precision when a printing operation is performed using only some of a plurality of ejection nozzles. To achieve this object, according to this invention, in an ink-jet printing method for dividing all nozzles of an ink-jet head having a plurality of ink ejection nozzles into a plurality of nozzle groups each including nozzles separated by a predetermined number of nozzles, and performing a printing operation by switching the plurality of nozzle groups as needed, the printing operation is performed while variations in ejection amount of the nozzles are made uniform for each nozzle group.

14 Claims, 14 Drawing Sheets

7: LIGHT-TRANSMITTING PORTION
2: BLACK MATRIX
1: SUBSTRATE

3': RESIN COMPOSITION LAYER hv
4': PHOTOMASK
5': NON-COLORED PORTIONS

INK-JET HEAD hv

8: PROTECTION LAYER

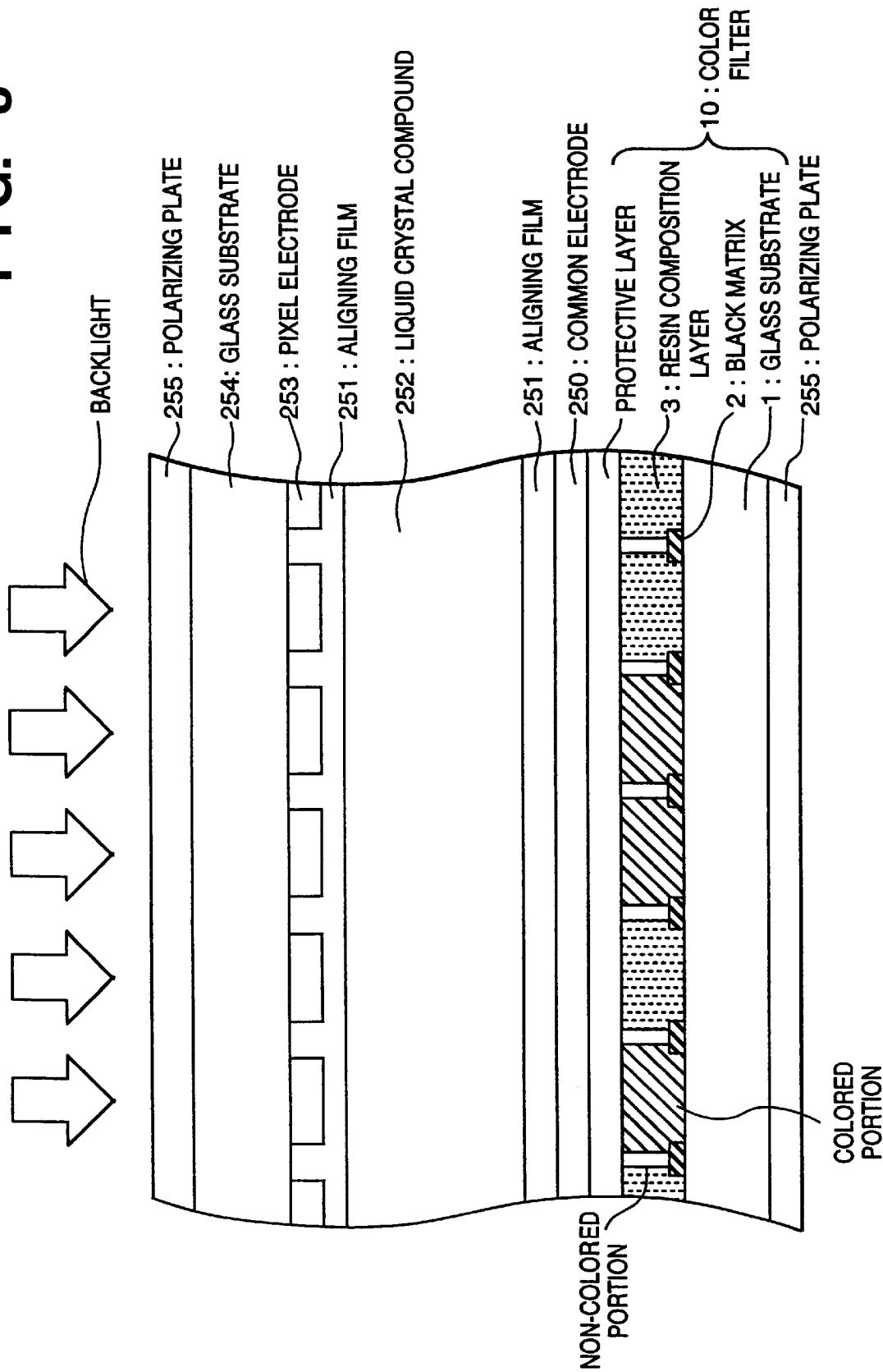

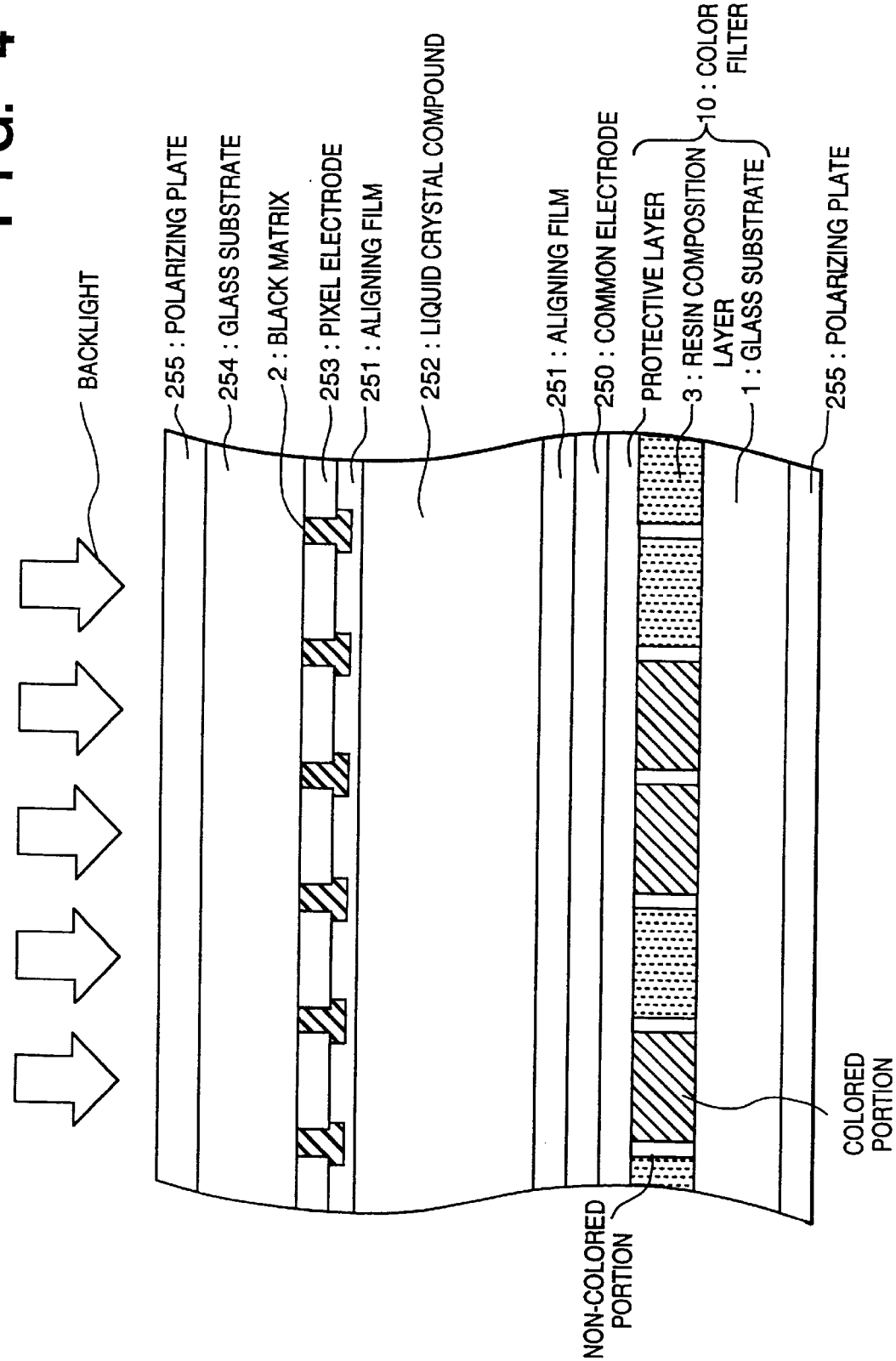

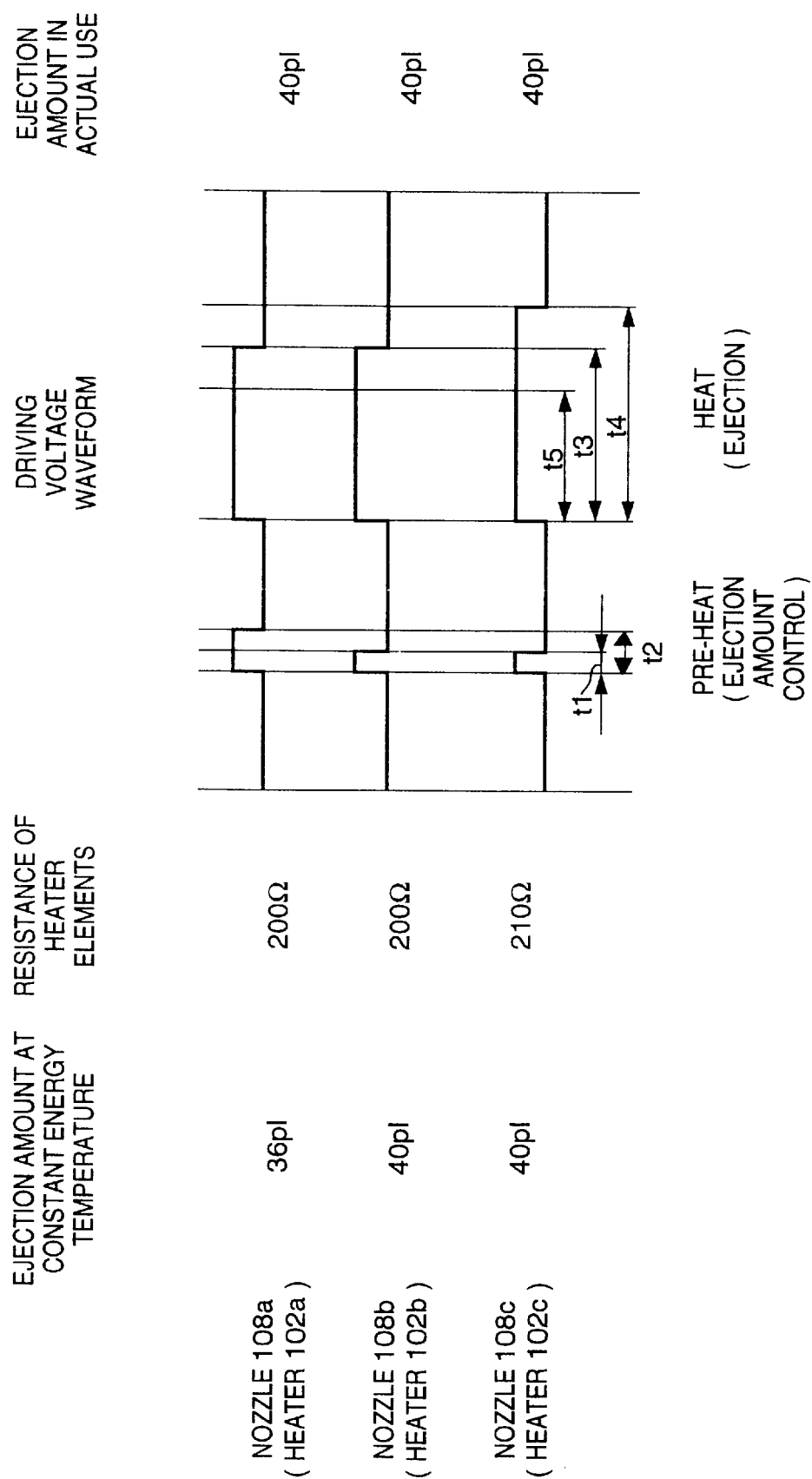

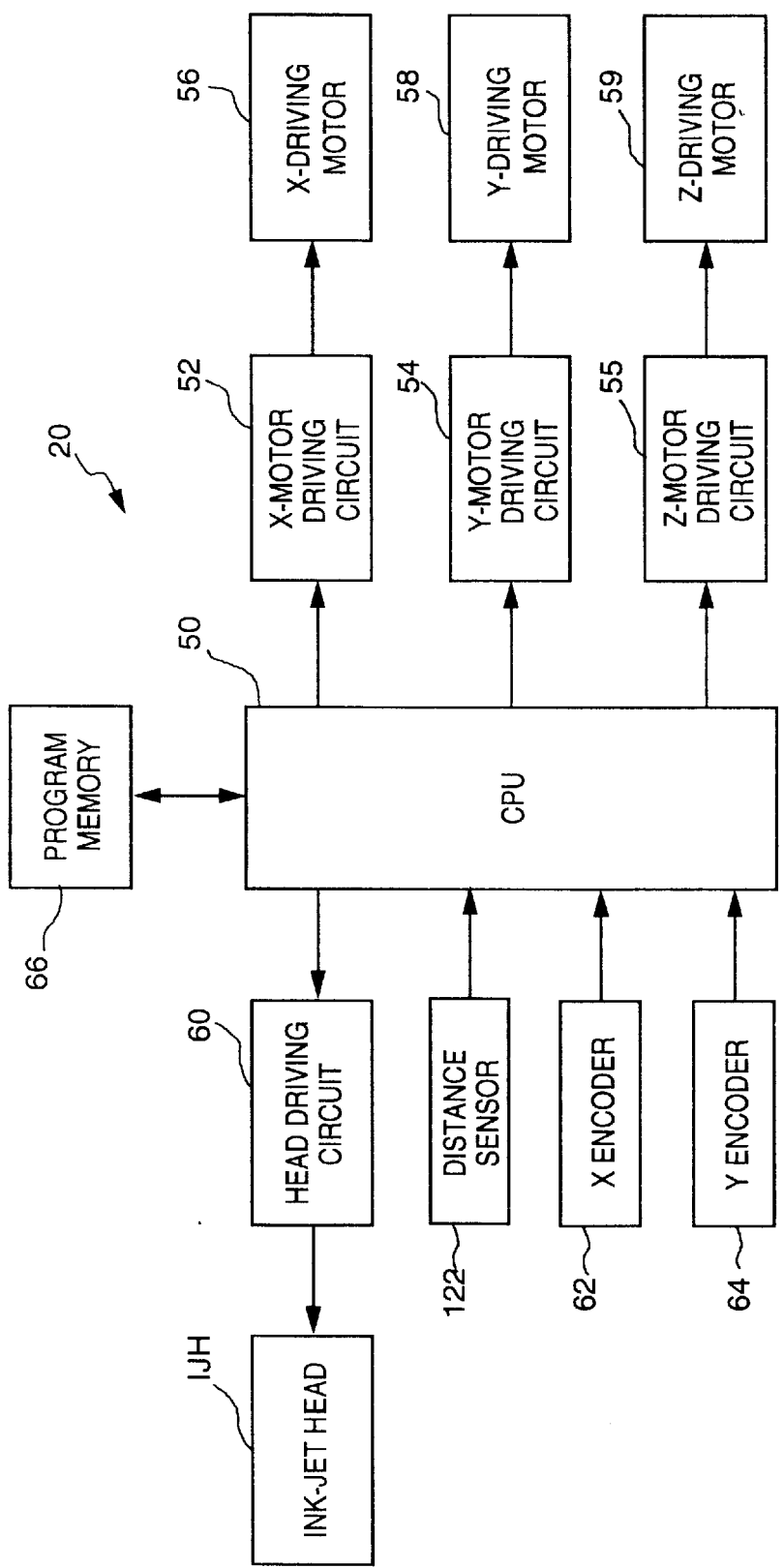

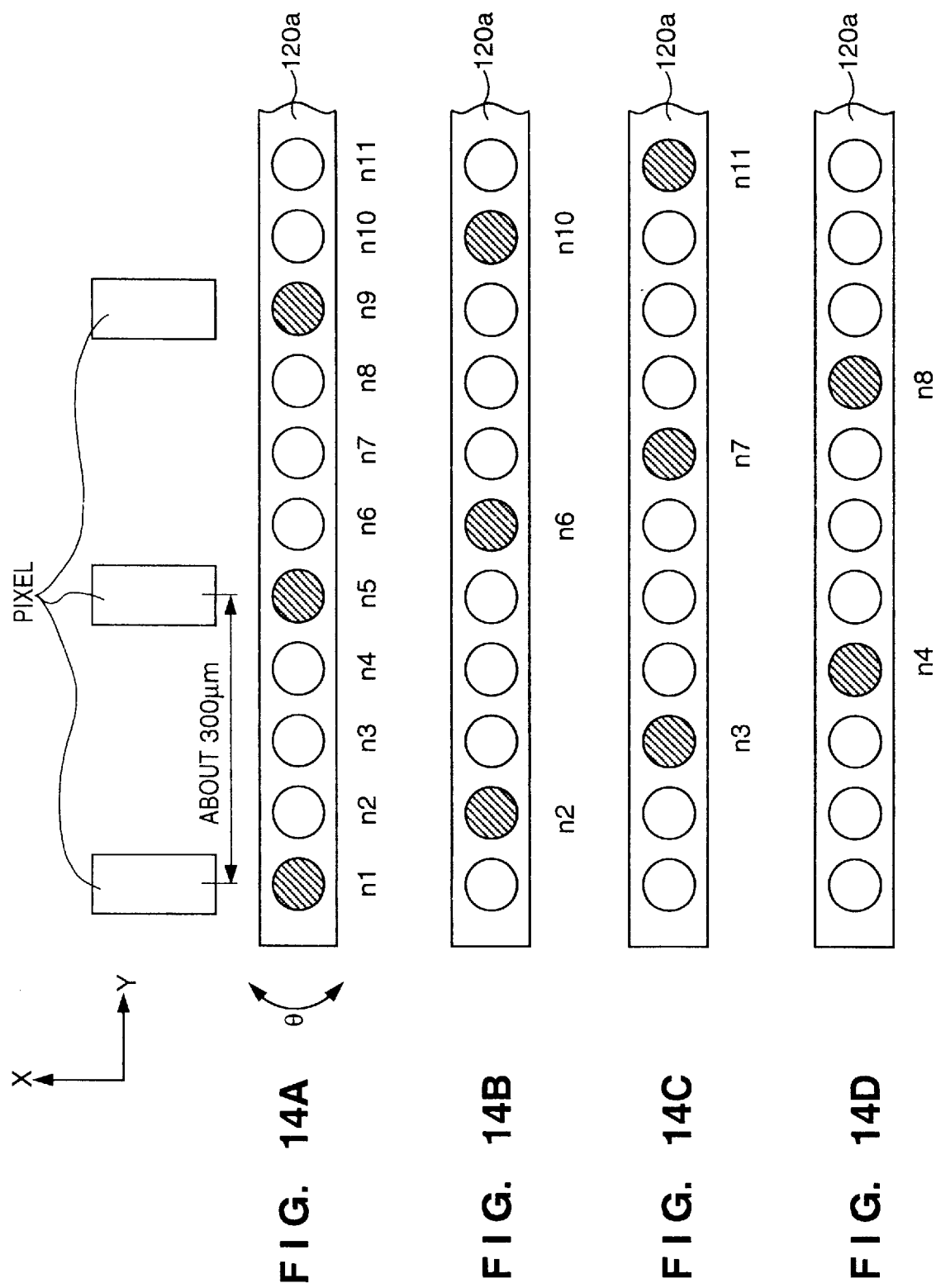

INK-JET PRINTING METHOD AND APPARATUS, AND METHOD AND APPARATUS FOR MANUFACTURING COLOR FILTER

BACKGROUND OF THE INVENTION

The present invention relates to an ink-jet drawing method and apparatus for performing drawing by dividing all nozzles of an ink-jet head having a plurality of ink ejection nozzles into a plurality of nozzle groups each including nozzles separated by a predetermined number of nozzles, and by switching these nozzle groups as needed, and a method and apparatus for manufacturing a color filter.

In recent years, along with development of personal computers, especially, portable personal computers, a demand for liquid crystal displays, in particular, color liquid crystal displays is growing. However, further spread of such portable personal computers requires a cost reduction of the liquid crystal displays and, especially, requires a cost reduction of color filters that account for a large portion of the total cost. Conventionally, various methods have been proposed to meet the above requirements while satisfying the required characteristics of the color filter. However, no method that can satisfy all the requirements has been established yet. These methods will be explained below.

The first method is a dyeing method. In the dyeing method, a water-soluble polymer as a dyeing material is applied on a glass substrate, and is patterned into a desired pattern by a photolithography process. Thereafter, the obtained pattern is dipped into a dyeing bath to obtain a colored pattern. By repeating this process three times, R, G, and B color filter layers are obtained.

The second method is a pigment dispersion method, and is replacing the dyeing method in recent years. In this method, a photosensitive resin layer dispersed with a pigment is formed on a substrate, and is patterned to obtain a single-color pattern. By repeating this process three times, R, G, and B color filter layers are obtained.

The third method is an electro-deposition method (anode process). In this method, a transparent electrode is patterned on a substrate which is then dipped in an electro-deposition coating solution mixed with a pigment, a resin, an electrolyte, and the like to electrically deposite the first color. This process is repeated three times to form R, G, and B coating layers. Thereafter, the resin is thermally cured to form a color specification layer.

The fourth method is a print method. In this method, a pigment is dispersed in a thermo-setting resin, and a print process is repeated three times to form R, G, and B coating layers. Thereafter, the resin is thermally cured to form a colored layer. In any of these methods, it is a common practice to form a protection layer on the colored layer.

A common feature to these methods is that an identical process must be repeated three times to obtain three colors, resulting in high cost. As the number of processes becomes larger, the yield lowers. Furthermore, the electro-deposition method cannot be applied to a TFT color liquid crystal display by the state-of-the-art technique since the available pattern shape is limited. Also, the print method cannot form a fine-pitch pattern since it suffers poor resolving and smoothing characteristics.

In order to compensate for these drawbacks, Japanese Patent Laid-Open No. 59-75205, 63-235901, 63-294503, 1-217320, or the like describes a method of manufacturing a color filter using an ink-jet method.

In the case of an ink-jet printer that prints on a recording medium such as a normal paper sheet, the arrangement pitch of nozzles of an ink-jet head developed by the present applicant et. al. is 360 dpi, i.e., about 70.5 $\mu$m. In the manufacture of a color filter as well, it may be efficient to use such head that has already been developed for a printer since no development cost for a new head is required. However, the pitch between adjacent pixels of a color filter is often as large as about 300 $\mu$m, and does not match that of the ink-jet head for a normal printer. For this reason, the present applicant et. al. uses the nozzles, of the head for printer, that are separated by three or four nozzles, so that the pitch between adjacent nozzles is adjusted to that between adjacent pixels of the color filter. More specifically, when a coloring process is performed by scanning the head on a color filter substrate, the number of nozzles to be used for coloring a single color filter is about ¼ to ⅕ the total number of nozzles of the ink-jet head.

In the manufacture of a color filter, the precision of the amount of ink per ejection has a very large influence on the quality of a completed color filter. If the nozzles of the ink-jet head suffer variations in ejection amount, the quality of the color filter deteriorates. For this reason, in the manufacture of a color filter, the ejection amounts of the respective nozzles must be adjusted to become close to a given constant value as much as possible. Conventionally, such adjustment is attained by setting the ejection amounts of all the nozzles of the ink-jet head to become close to a given constant value (e.g., the average value of the ejection amounts of all the nozzles). However, as has already been described above, since the number of nozzles used for manufacturing a single color filter is about ¼ to ⅕ the total number of nozzles, the average value calculated by sampling the ejection amounts of all the nozzles includes as data information of the ejection amounts of nozzles other than those to be actually used. For this reason, the adjustment precision of the ejection amounts is impaired due to the influence of extraneous data.

SUMMARY OF THE INVENTION

The present invention has been made in consideration of the above-mentioned problems, and has as its object to provide an ink-jet drawing method and apparatus that make uniform the ejection amounts of nozzles when drawing is performed using some of a plurality of ejection nozzles, and a method and apparatus for manufacturing a color filter.

In order to solve the above-mentioned problems and to achieve the above object, an ink-jet drawing method according to the present invention is characterized by the following arrangement.

That is, there is provided an ink-jet drawing method for dividing all nozzles of an ink-jet head having a plurality of ink ejection nozzles into a plurality of nozzle groups each including nozzles separated by a predetermined number of nozzles, and performing a drawing operation by switching the plurality of nozzle groups as needed, wherein the drawing operation is performed while variations in ejection amount of the nozzles are made uniform for each of the plurality of nozzle groups.

An ink-jet drawing apparatus according to the present invention is characterized by the following arrangement.

That is, there is provided an ink-jet drawing apparatus having first control means for dividing all nozzles of an ink-jet head having a plurality of ink ejection nozzles into a plurality of nozzle groups each including nozzles separated by a predetermined number of nozzles, and performing a drawing operation by switching the plurality of nozzle groups as needed, comprising storage means for pre-storing ejection amount data of all nozzles of the ink-jet head under a predetermined condition, and second control means for independently making uniform variations in ejection amounts of the nozzles for each of the plurality of nozzle groups on the basis of the ejection amount data stored in the storage means.

A method of manufacturing a color filter according to the present invention is characterized by the following arrangement.

That is, there is provided a method of manufacturing a color filter by coloring a color filter substrate by dividing all nozzles of an ink-jet head having a plurality of ink ejection nozzles into a plurality of nozzle groups each including nozzles separated by a predetermined number of nozzles, and performing a drawing operation by switching the plurality of nozzle groups as needed, wherein the drawing operation is performed while variations in ejection amount of the nozzles are made uniform for each of the plurality of nozzle groups.

A color filter manufacturing apparatus according to the present invention is characterized by the following arrangement.

That is, there is provided a color filter manufacturing apparatus having first control means for coloring a color filter substrate by dividing all nozzles of an ink-jet head having a plurality of ink ejection nozzles into a plurality of nozzle groups each including nozzles separated by a predetermined number of nozzles, and performing a drawing operation by switching the plurality of nozzle groups as needed, comprising storage means for pre-storing ejection amount data of all nozzles of the ink-jet head under a predetermined condition, and second control means for independently making uniform variations in ejection amounts of the nozzles for each of the plurality of nozzle groups on the basis of the ejection amount data stored in the storage means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a sectional view showing the structure obtained when a color filter manufactured by a manufacturing apparatus according to an embodiment of the present invention is assembled in a TFT liquid crystal panel;

FIG. 4 is a sectional view showing the structure obtained when a color filter manufactured by the manufacturing apparatus according to the embodiment of the present invention is assembled in a TFT liquid crystal panel;

FIG. 12 is a chart for explaining the method of controlling the ejection amount of an ink by changing the electric power to be supplied to a heater;

FIG. 13 is a schematic block diagram showing the arrangement of the manufacturing apparatus according to the embodiment of the present invention; and FIGS. 14A to 14D are views for explaining the way of using the nozzles of an ink-jet head.

DETAILED DESCRIPTION OF THE PREFERRED EMBODIMENT

The preferred embodiment of the present invention will be described in detail hereinafter with reference to the accompanying drawings.

FIGS. 1A to 1F show the processes in the manufacture of a color filter by a color filter manufacturing apparatus using an ink-jet drawing apparatus according to an embodiment of the present invention.

In this embodiment, a glass substrate is normally used as a substrate 1. However, the present invention is not limited to the glass substrate but any other substrates may be used as long as they have characteristics such as transparency, a mechanical strength, and the like required for a color filter for a liquid crystal display.

Figure 1A:
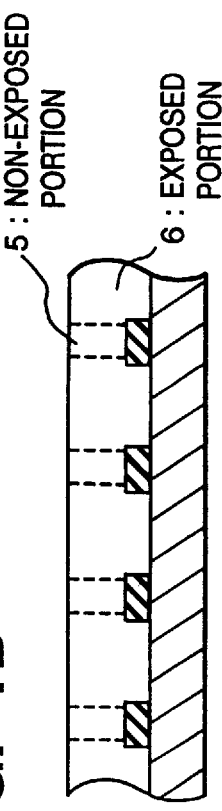
FIGS. 1A to 1F are sectional views for explaining the manufacturing processes of a color filter.

In order to obtain a sharp image by defining clear divisions of pixels of a color filter, a glass substrate formed with a black matrix 2 is prepared (FIG. 1A). As a method of forming the black matrix, the following method is available. That is, a metal thin film is formed by sputtering or deposition, and is patterned by a photolithography process.

Figure 1B:
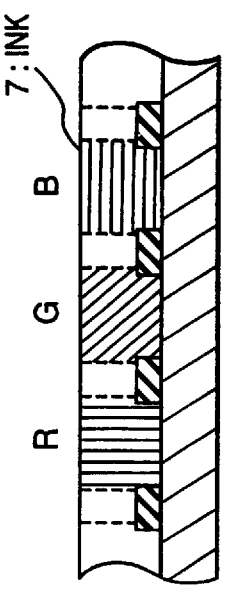
Figure 1C:
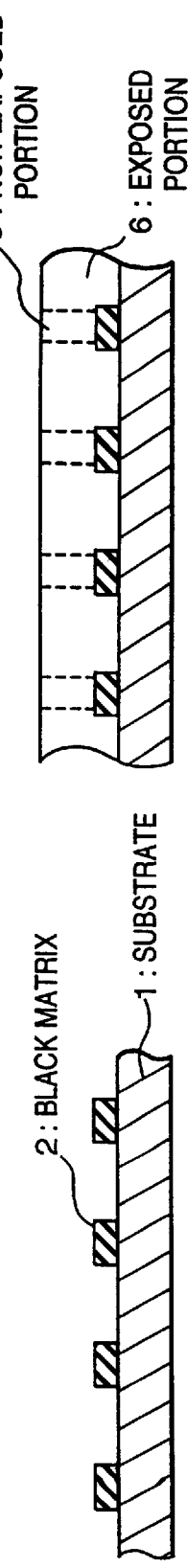

As shown in FIG. 1B, a coating material according to this embodiment is applied on the substrate 1 formed with the black matrix 2, and is pre-baked, as needed, thereby forming a resin composition layer 3, the ink absorbency in which increases by at least one of light. irradiation or a heat treatment. As the coating material, a resin composition that can increase the ink absorbency of an exposed portion by exposure or a combination of exposure and a heat treatment is used. This is to prevent color inks from mixing and to prevent inks from over-diffusing by utilizing the fact that an exposed portion and a non-exposed portion have different ink absorbencies.

Figure 1D:
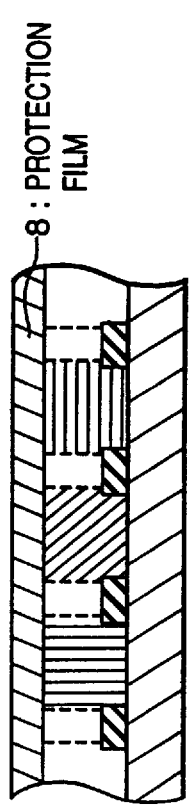
Figure 1E:
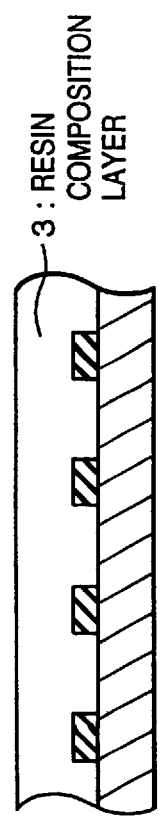

An ink affinity process is performed by pattern-exposing the coating material in portions which are not shielded by the black matrix 2 via a mask 4 (FIG. 1C), thus forming a latent image (FIG. 1D).

Subsequently, portions 6 with ink affinity are colored by R (red), G (green), and B (blue) inks using an ink-jet head (FIG. 1E), and the inks are dried as needed.

Figure 1F:
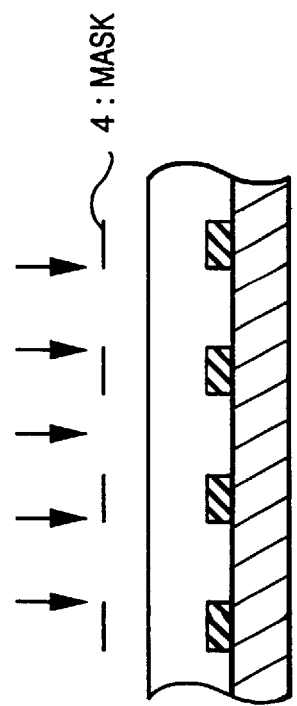

Light irradiation, a heat treatment, or a light irradiation & heat treatment are performed to cure the colored coating material, and a protection film 8 is formed as needed (FIG. 1F). As the protection film 8, a photo-setting resin material, a thermo-setting resin material, a photo-/thermo-setting resin material, an inorganic film formed by deposition, sputtering, or the like, and so on, may be used, and any other materials may be used as long as they have transparency as a constituting element of a color filter, and can withstand the subsequent ITO (Indium Tin Oxide) formation process, an orientation film formation process, and the like.

FIGS. 2A to 2F show another manufacturing process of the color filter.

Figure 2A:
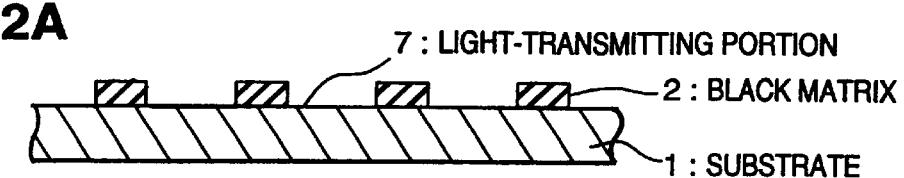
FIGS. 2A to 2F are sectional views showing another example of the manufacturing process of a color filter.
Figure 2B:
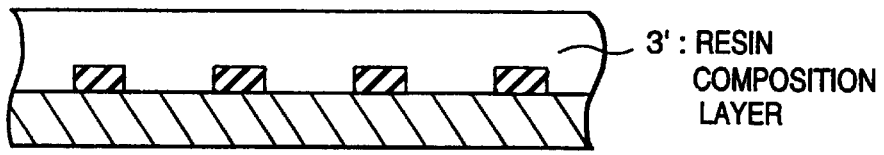

FIG. 2A shows a glass substrate 1 comprising light-transmitting portions 7 and a black matrix 2 serving as light-shielding portions. The substrate 1 formed with the black matrix 2 is coated with a resin composition, which is pre-baked as needed to form a resin layer 3' (FIG. 2B). In this case, the resin composition can be cured upon light irradiation or light irradiation and heating, and has ink receptivity. The resin composition layer 3' may be formed by various coating methods such as a spin coating method, a roll coating method, a bar coating method, a spray coating method, a dip coating method, and the like, and the method to be used is not particularly limited.

Figure 2C:
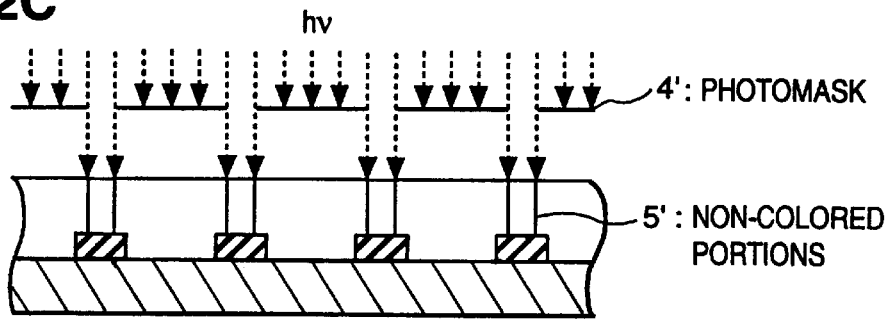
Figure 2D:
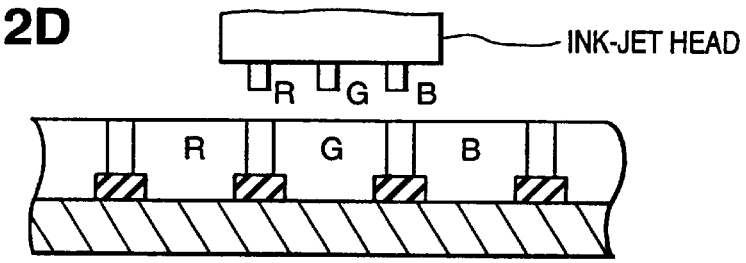

Subsequently, portions, corresponding to the light-shielding portions of the black matrix 2, of the resin layer are subjected to pattern exposure in advance using a photomask 4', and are cured to form portions 5' (non-colored portions) which do not absorb any ink (FIG. 2C). Thereafter, using an ink-jet head, R, G, and B inks are ejected onto other portions to color them (FIG. 2D), and are dried as needed.

As the photomask 4' used upon pattern exposure, a mask having aperture portions for curing the light-shielding portions of the black matrix 2 is used. In this case, in order to prevent color omission on portions contacting the black matrix, a relatively large amount of ink must be supplied. For this purpose, a mask having aperture portions narrower than the (light-shielding) widths of the black matrix is preferably used.

As the ink used for coloring, both dye- and pigment-based inks may be used, and both liquid and solid inks may be used.

As the curable resin composition used in this embodiment, the present invention is not particularly limited to a specific one as long as the resin has ink receptivity, and can be cured by at least one treatment of light irradiation and heating. As the resin, for example, an acrylic resin, epoxy resin, silicone resin, cellulosics such as hydroxypropyl cellulose, hydroxyethyl cellulose, methyl cellulose, carboxymethylcellulose, and the like or their modified substances, and the like may be used.

In order to promote the crosslinking reaction of such resins by means of light or light and heat, a light initiator (crosslinking agent) may be used. As the light initiator, a dichromate, a bisazide, a radical-based initiator, a cation-based initiator, an anion-based initiator, and the like may be used. Alternatively, these light initiators may be mixed or may be used in combination with other sensitizing agents. Furthermore, a photo-acid generation agent such as an onium salt may be used as a crosslinking agent together. In order to further promote the crosslinking reaction, a heat treatment may be performed after light irradiation.

Since the resin layer containing such compositions has very high heat and water resistances, it can sufficiently withstand a high-temperature or washing process to be performed later.

As the ink-jet method used in the present invention, a bubble-jet type using electro-thermal energy converting elements as energy generation elements, a piezo-jet type using piezoelectric elements, or the like may be used, and the coloring area and coloring pattern may be arbitrarily set.

In this example, the black matrix is formed on the substrate. This black matrix may be formed on the resin layer after a curable resin composition layer is formed or after coloring, and its pattern is not limited to that of this example. As the formation method of the black matrix, it is preferable that a metal thin film be formed on the substrate by sputtering or deposition, and be patterned by a photolithography process. However, the present invention is not limited to this particular method.

Figure 2E:
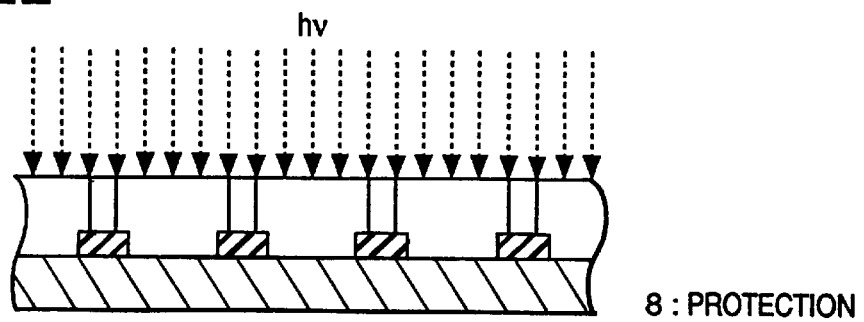
Figure 2F:
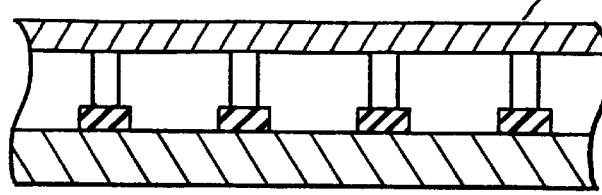

Subsequently, only a heat treatment or a light irradiation & heat treatment is performed to cure the curable resin composition (FIG. 2E), and a protection layer 8 is formed (FIG. 2F) as needed. Note that hν in FIGS. 2C and 2E represents the light intensity, and in the case of the heat treatment, heat is applied in place of light. As the protection layer 8, arbitrary layers may be used as long as they can be formed using a photo-setting type, a thermo-setting type, or a photo-/thermo-setting type second resin composition, or can be formed using an inorganic material by deposition or sputtering, have transparency as a constituting element of the color filter, and can sufficiently withstand an ITO formation process, an orientation film formation process, or the like to be performed later.

FIGS. 3 and 4 are sectional views of a TFT (Thin Film Transistor) color liquid crystal panel which is assembled with the color filter according to this embodiment. Note that the form of the color liquid crystal panel is not limited to that of this embodiment.

A color liquid crystal panel is normally formed by combining a color filter substrate 1 and a counter substrate 254, and sealing a liquid crystal compound 252 therebetween. TFTs (Thin Film Transistors) and transparent pixel electrodes 253 are formed in a matrix on the inner surface of one substrate 254 of the liquid crystal panel. A color filter 10 is arranged on the inner surface of the other substrate 1 so that R, G, and B color elements are disposed at positions opposing the pixel electrodes, and a transparent counter electrode (common electrode) 250 is formed on the entire surface of the color filter 10. A black matrix 2 is normally formed on the color filter substrate 1 side (see FIG. 3). However, in a BM (black matrix) on-array type liquid crystal panel, the black matrix 2 is formed on the TFT counter substrate side (see FIG. 4). Furthermore, orientation films 251 are formed as the innermost layers of the two substrates, and are subjected to a rubbing process, so that liquid crystal molecules align in a predetermined direction. Polarization plates 255 are adhered to the outer surfaces of the two glass substrates, and the liquid crystal compound 252 is filled in a gap (about 2 to 5 μm) between these two glass substrates. As a backlight, a combination of a fluorescent lamp and a scattering plate (neither are shown) are normally used, and a display operation is attained when the liquid crystal compound serves as an optical shutter that changes the transmittance of light emitted by the backlight.

A case will be exemplified below with reference to FIGS. 5 to 7 wherein such liquid crystal panel is applied to an information processing apparatus.

Figure 5:
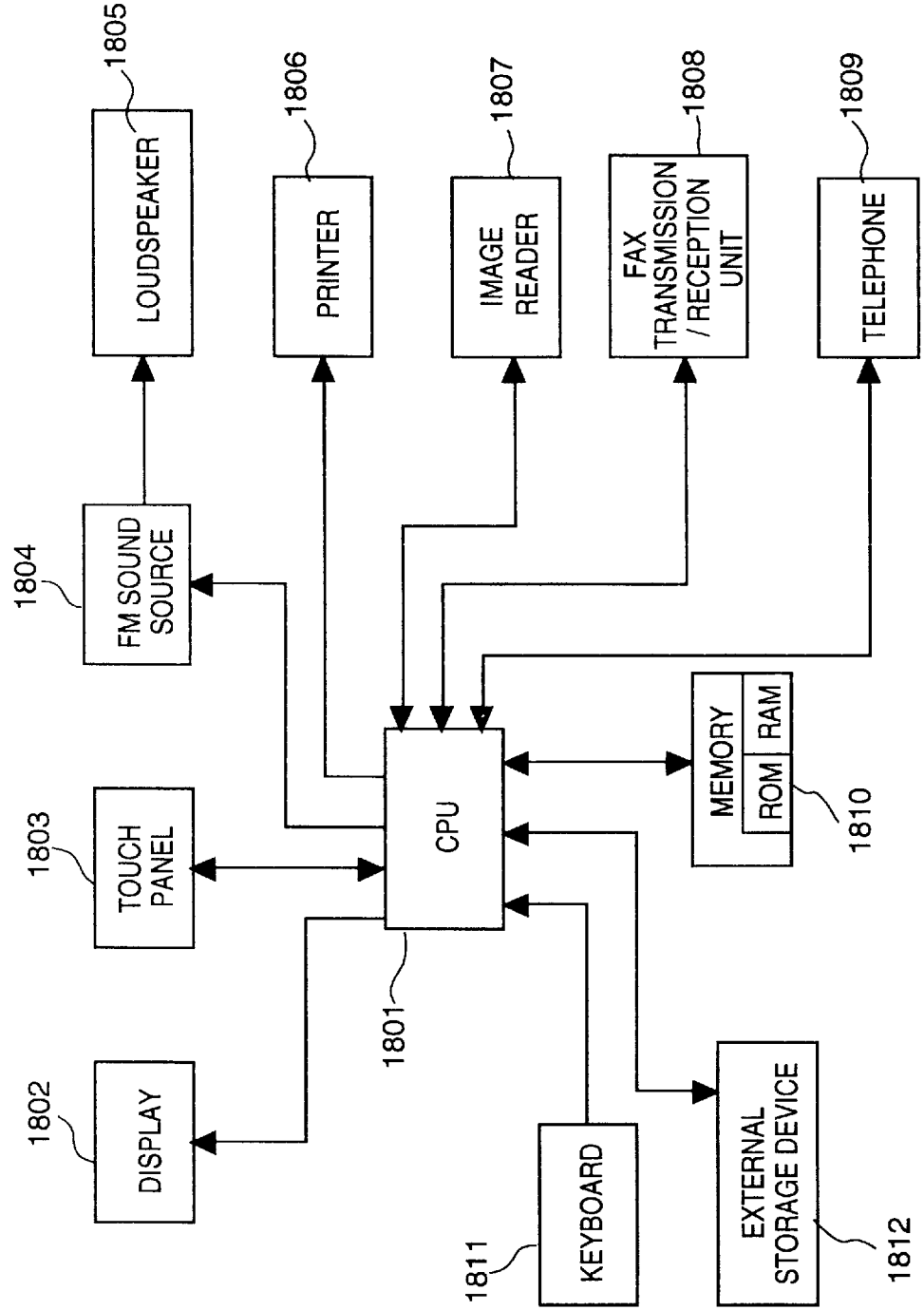
FIG. 5 is a block diagram showing an information processing apparatus in which the liquid crystal panel is used.

FIG. 5 is a schematic block diagram showing the arrangement used when the above-mentioned liquid crystal display device is applied to an information processing apparatus having functions of a wordprocessor, a personal computer, a facsimile apparatus, and a copying machine.

Referring to FIG. 5, reference numeral 1801 denotes a control unit for controlling the entire apparatus. The control unit 1801 comprises a CPU such as a microprocessor or the like, and various I/O ports, and makes control by outputting control signals, data signals, and the like to the respective units, and receiving control signals and data signals from the respective units. Reference numeral 1802 denotes a display for displaying various menus, document information, image data read by an image reader 1807, and the like on its display screen. Reference numeral 1803 denotes a touch panel arranged on the display 1802. When a user presses the surface of the touch panel 1803 with, e.g., his or her finger, he or she can input an item, coordinate position, and the like on the display 1802.

Reference numeral 1804 denotes an FM (Frequency Modulation) sound source unit which stores music information created by, e.g., a music editor or the like in a memory 1810 or an external storage device 1812 as digital data, and FM-modulates the digital data read out from the memory or the like. An electrical signal from the FM sound source unit 1804 is converted into audible tones via a loudspeaker 1805. A printer 1806 is used as an output terminal for the wordprocessor, personal computer, facsimile apparatus, and copying machine.

Reference numeral 1807 denotes an image reader for photoelectrically reading original data and inputting read original data. The image reader 1807 is arranged in the original convey path, and reads various kinds of originals such as facsimile originals, copy originals, and the like.

Reference numeral 1808 denotes a facsimile (FAX) transmission/reception unit for performing facsimile-transmission of original data read by the image reader 1807, and receiving and decoding an incoming facsimile signal. The FAX transmission/reception unit 1808 has an interface function with external devices. Reference numeral 1809 denotes a telephone unit having various telephone functions such as a normal telephone function, an automatic answering telephone function, and the like.

Reference numeral 1810 denotes a memory which includes a ROM for storing a system program, a manager program, other application programs, character fonts, dictionaries, and the like, a VRAM for storing an application program, document information, video information, and the like loaded from the external storage device 1812, and the like.

Reference numeral 1811 denotes a keyboard for inputting document information, various commands, and the like.

Reference numeral 1812 denotes an external storage device using, as storage media, a floppy disk, a hard disk, and the like. The external storage device 1812 stores document information, music or voice information, user's application programs, and the like.

Figure 6:
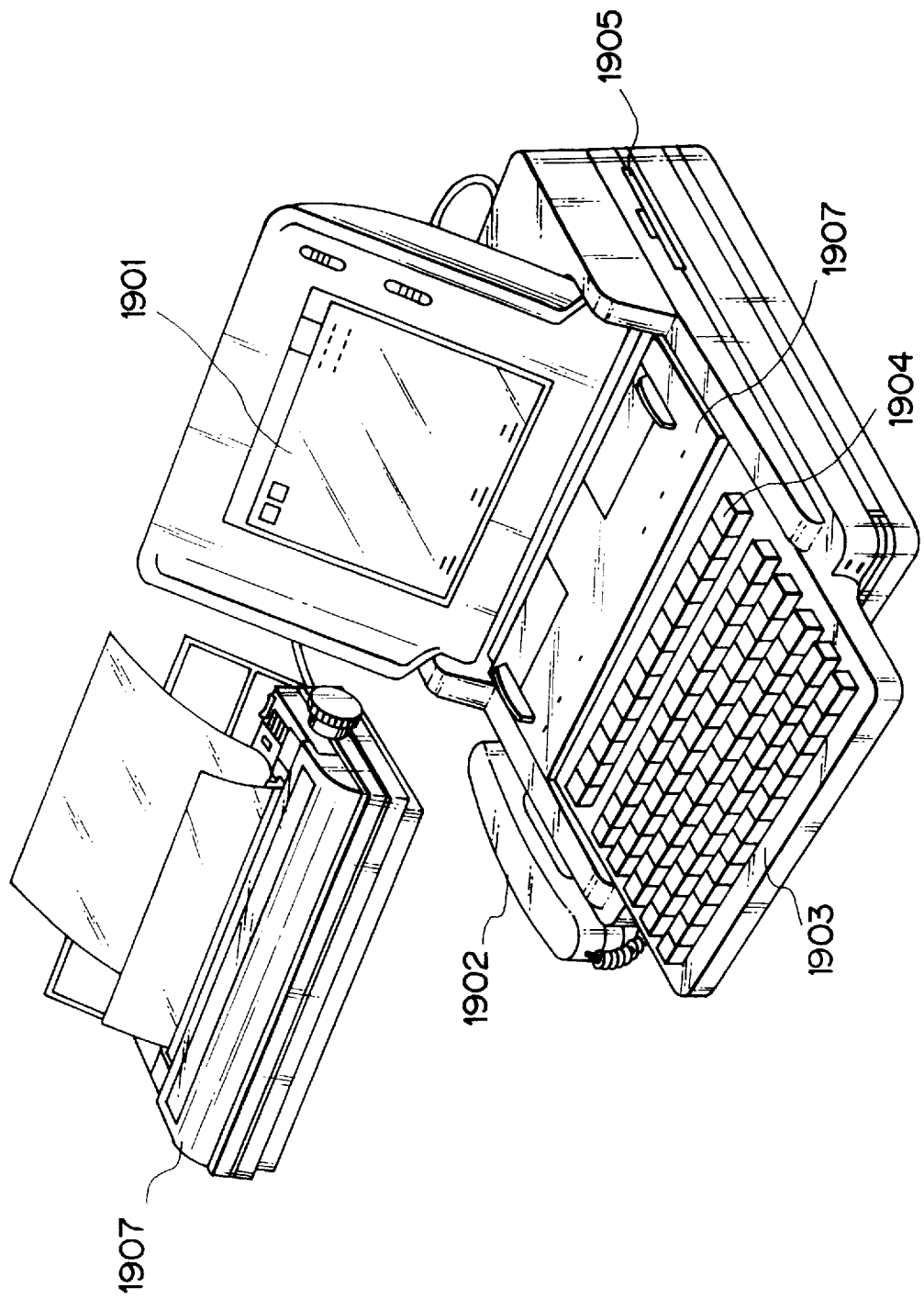
FIG. 6 is a perspective view showing an information processing apparatus in which the liquid crystal panel is used.

FIG. 6 is a schematic perspective view of the information processing apparatus shown in FIG. 5.

Referring to FIG. 6, reference numeral 1901 denotes a flat panel display which utilizes the above-mentioned liquid crystal display device, and displays various menus, figure information, document information, and the like. On the display 1901, the coordinate input operation and the item designation input operation can be performed by pressing the surface of the touch panel 1803 with a finger or the like. Reference numeral 1902 denotes a handset used when the apparatus serves as a telephone set. A keyboard 1903 is detachably connected to the main body via a cord, and can attain various document functions and various data input operations. The keyboard 1903 has various function keys 1904 and the like. Reference numeral 1905 denotes an insertion slot of a floppy disk as one medium of the external storage device 1812.

Reference numeral 1906 denotes a paper placing unit where an original to be read by the image reader 1807 is placed. The read original is exhausted from the rear portion of the apparatus. In a facsimile reception mode or the like, received data is printed by an ink-jet printer 1907.

When the information processing apparatus serves as a personal computer or wordprocessor, various kinds of information input from the keyboard 1811 are processed by the control unit 1801 in accordance with a predetermined program, and are output as images via the printer 1806.

When the apparatus serves as a receiver of the facsimile apparatus, facsimile information input from the FAX transmission/reception unit 1808 via a communication line is subjected to reception processing in accordance with a predetermined program, and is output as a received image via the printer 1806.

When the apparatus serves as a copying machine, an original image is read by the image reader 1807, and the read original data is supplied from the control unit 1801 to the printer 1806 and is output as a copy image. When the apparatus serves as a transmitter of the facsimile apparatus, original data read by the image reader 1807 is subjected to transmission processing by the control unit 1801 in accordance with a predetermined program, and is transmitted onto the communication line via the FAX transmission/reception unit 1808.

Figure 7:
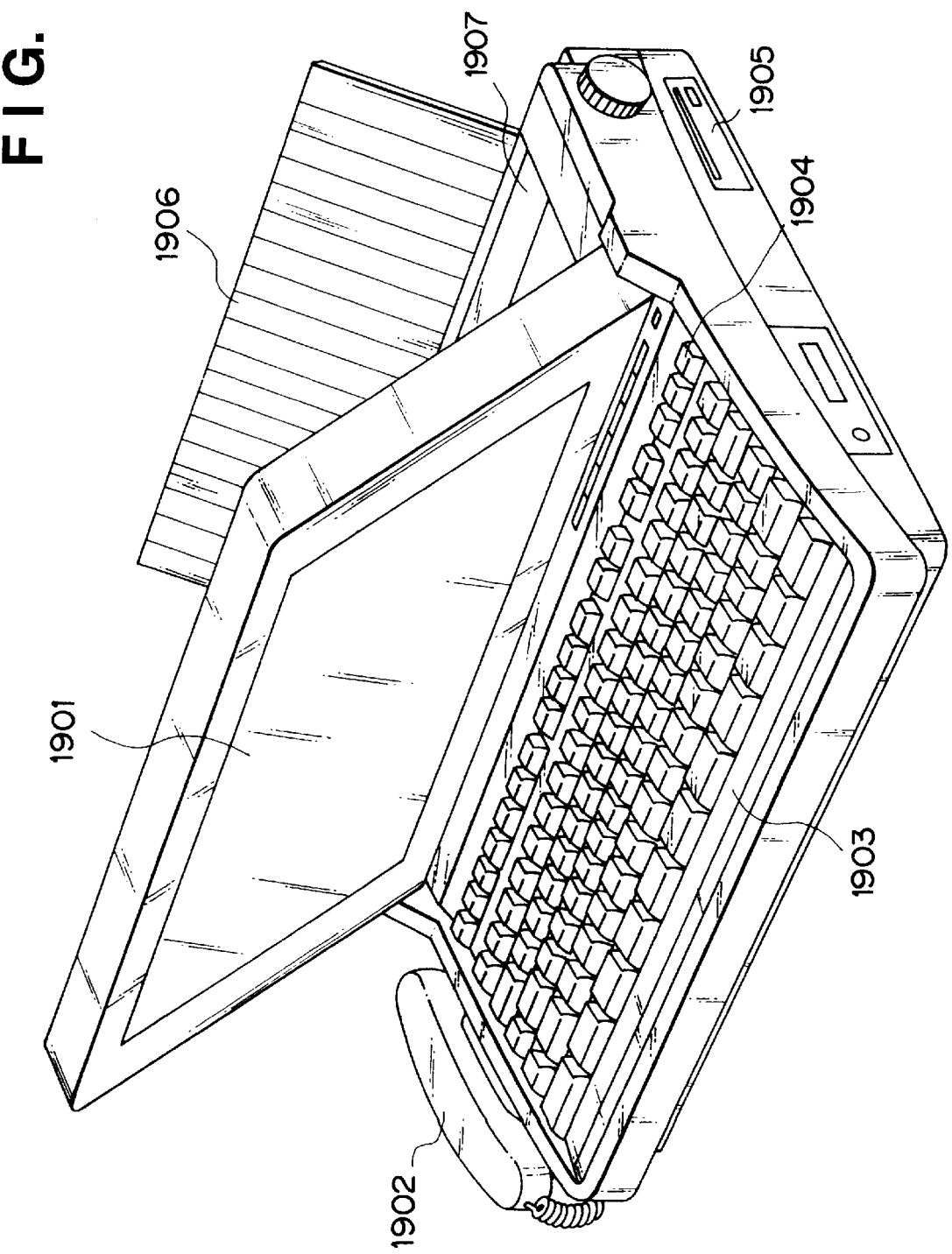
FIG. 7 is a perspective view showing an information processing apparatus in which the liquid crystal panel is used.

The above-mentioned information processing apparatus may have an integrated structure that incorporates an ink-jet printer therein, as shown in FIG. 7. In this case, the portability can be improved. The same reference numerals in FIG. 7 denote the same parts as in FIG. 6.

Figure 8:
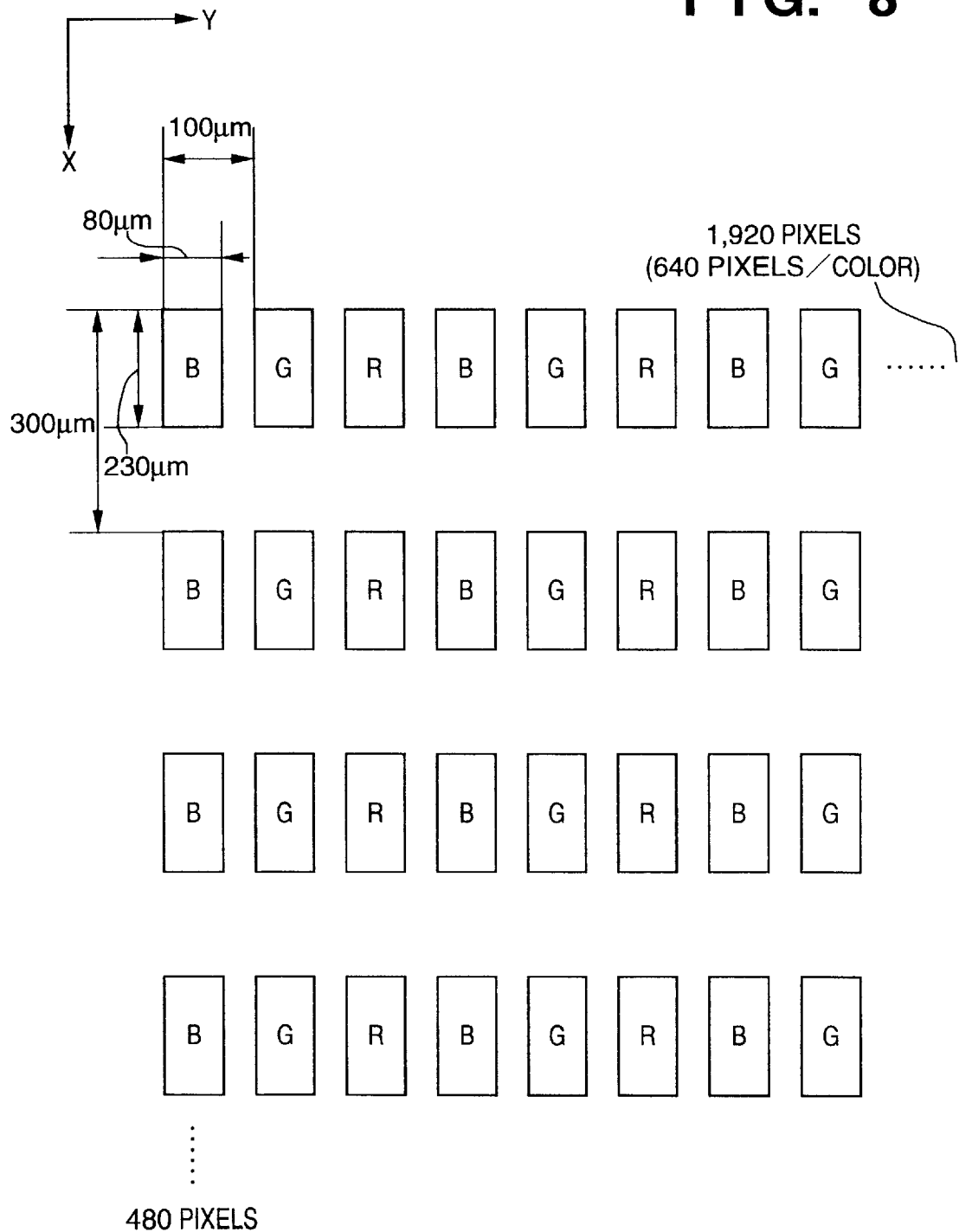
FIG. 8 is a view showing the pattern of a color filter manufactured by the manufacturing apparatus according to the embodiment of the present invention.

FIG. 8 shows the color pattern of the color filter manufactured by a color filter manufacturing apparatus of this embodiment. Each of colored portions colored by R, G, and B inks serves as one pixel, and has a substantially rectangular shape. If the X-direction represents the longitudinal direction of one pixel, and the Y-direction represents a direction perpendicular to the X-direction, the dimensions of one pixel are 230 $\mu$m×80 $\mu$m, the pitch in the X-direction is 300 $\mu$m, and the pitch in the Y-direction is 100 $\mu$m (the same applies to all the pixels). Pixels are arranged, such that pixel arrays in the X-direction have identical colors, and adjacent pixels in the Y-direction have different colors. The pattern shown in FIG. 8 corresponds to that of the black matrix formed in the process shown in FIG. 1A.

Figure 9:
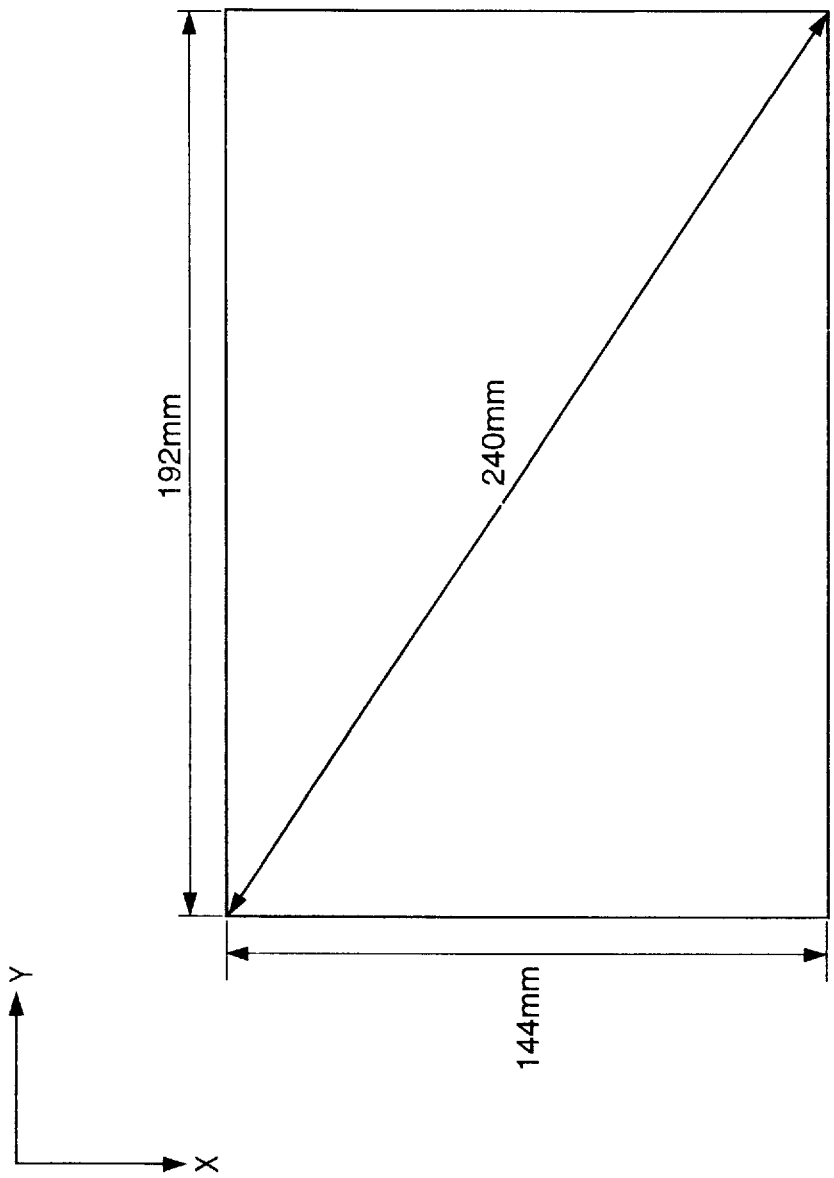
FIG. 9 is a view showing the dimensions of a display unit when the color filter manufactured by the manufacturing apparatus according to the embodiment of the present invention is assembled in the TFT liquid crystal panel.

The number of pixels is 480 in the X-direction×1,920 (640 pixels/color) in the Y-direction. As shown in FIG. 9, the dimensions of the screen of the color filter are 144 mm×192 mm, and the diagonal length (240 mm) corresponds to that for a 9.4" liquid crystal panel.

Figure 10:
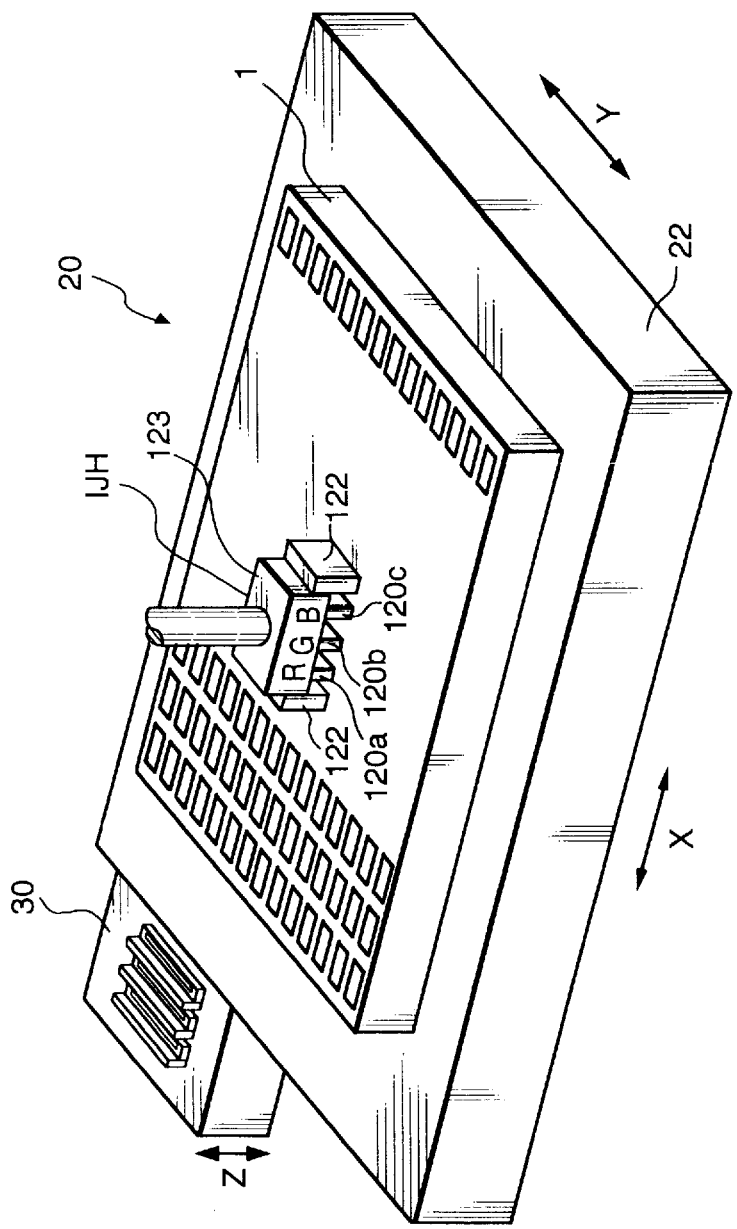
FIG. 10 is a schematic perspective view showing the arrangement of the manufacturing apparatus according to the embodiment of the present invention.

FIG. 10 shows the arrangement of a manufacturing apparatus for manufacturing the color filter shown in FIG. 8.

Referring to FIG. 10, a manufacturing apparatus 20 comprises an X-Y table 22, which is placed on a frame (not shown) and is movable in the X- and Y-directions in FIG. 10, and an ink-jet head IJH fixed on the frame via a support member (not shown) to be located above the X-Y table 22. On the X-Y table 22, a glass substrate 1 formed with a black matrix 2 and a resin composition layer 3 by the above-mentioned method is placed. The ink-jet head IJH comprises a red head 120a for ejecting red ink, a green head 120b for ejecting green ink, and a blue head 120c for ejecting blue ink. These heads 120a, 120b, and 120c can eject inks independently.

Distance sensors 122 each for detecting the distance between the ink-jet head IJH and the glass substrate 1 are arranged on the two side portions, in the scanning direction (X-direction), of the ink-jet head IJH. These distance sensors 122 always monitor the distance between the ink-jet head IJH and the glass substrate 1. As the distance sensors 122, for example, laser interferometer sensors, or the like are used. However, the present invention is not limited to specific sensors, but any other sensors may be used as long as they can measure the distance between the substrate and the ink-jet head in a non-contact manner.

A recovery unit 30 for performing the recovery operation of the ink-jet head IJH is arranged on one end portion of the X-Y table 22, and is movable in the Z-direction with respect to the X-Y table 22.

The recovery unit 30 has a function of always assuring normal ejection of ink by preventing clogging of nozzles of the ink-jet head IJH and wiping out ink or dust attached to the nozzle surface of the ink-jet head IJH, and also a function of preventing errors due to dust attached to the nozzle surface and dropped onto the glass substrate during coloring.

Figure 11:
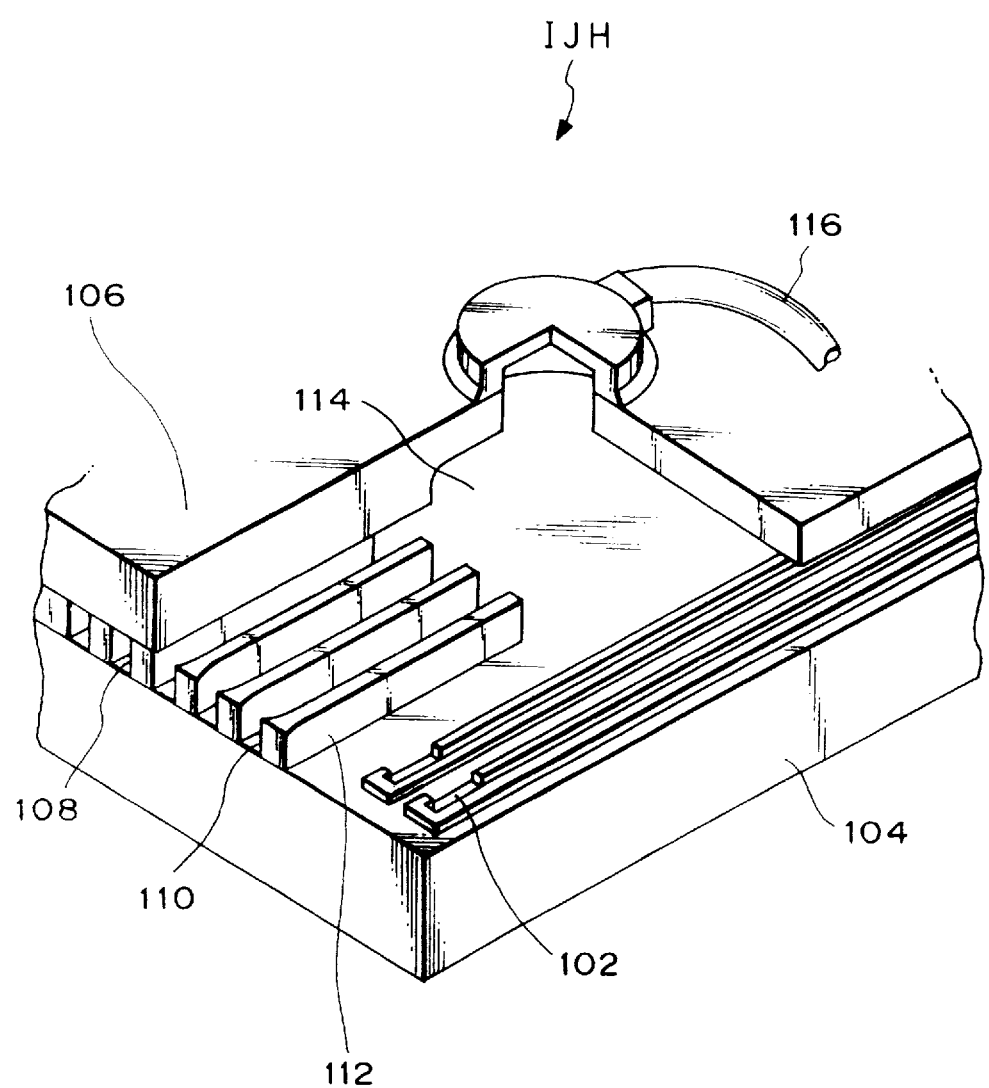
FIG. 11 is a partially cutaway perspective view showing the structure of an ink-jet head.

FIG. 11 shows the structure of the ink-jet head IJH for ejecting inks onto the resin composition layer 3. Since the three ink-jet heads 120a, 120b, and 120c have the same structure, the head shown in FIG. 11 represents one of these heads.

Referring to FIG. 11, the ink-jet head IJH is mainly constituted by a heater board 104 as a board formed with a plurality of heaters 102 for heating ink, and a top plate 106 that covers the top of the heater board 104. The top plate 106 is formed with a plurality of ejection ports 108, and tunnel-shaped ink channels 110 that communicate with the ejection ports 108 are formed behind the ejection ports 108. Each ink channel 110 is partitioned from neighboring ink channels via partition walls 112. The rear ends of the ink channels 110 are commonly connected to a single ink reservoir 114. The ink reservoir 114 receives ink via an ink supply port 117, and supplies the ink to the respective ink channels 110.

The heater board 104 and the top plate 106 are aligned and assembled in a state shown in FIG. 11, so that the heaters 102 are located at positions corresponding to the ink channels 110. Although FIG. 11 illustrates only two heaters 102, the heaters 102 are arranged in correspondence with the respective ink channels 110. In the assembled state shown in FIG. 11, when a predetermined driving pulse is supplied to each heater 102, the ink on the heater 102 is boiled and forms a bubble, and the ink is pushed out and ejected from the corresponding ejection port 108 due to the volume expansion of the bubble. Therefore, by controlling the driving pulse to be applied to the heater 102, i.e., by controlling the magnitude of electric power, the size of the bubble can be adjusted, and hence, the volume of ink ejected from the ejection port 108 can be freely controlled.

FIG. 12 is a view for explaining the method of controlling the ejection amount of ink by changing the electric power to be supplied to each heater.

In this embodiment, in order to adjust the ejection amount of ink, two different constant voltage pulses are applied to each heater 102. The two pulses are a pre-heat pulse and a main heat pulse (to be simply referred to as a heat pulse hereinafter), as shown in FIG. 12. The pre-heat pulse is a pulse for heating ink to a predetermined temperature prior to actual ejection of ink, and is set to have a value smaller than a minimum pulse width t5 required for ejecting ink. Therefore, the pre-heat pulse is applied to the heater 102 to always make the ink ejection amount constant upon later application of the constant heat pulse, by raising the initial temperature of ink to a predetermined value. Conversely, the ink temperature can be adjusted in advance by adjusting the pulse width of the pre-heat pulse, and a different ink ejection amount can be obtained even when the same heat pulse is applied. The pre-heat pulse also serves to attain quick response characteristics by shortening the rise time of ink ejection upon application of the heat pulse since it heats ink prior to application of the heat pulse.

On the other hand, the heat pulse is a pulse for actually ejecting ink, and is set to have a value larger than the minimum pulse width t5 required for ejecting ink. Since the heater 102 generates energy in proportion to the width (application time) of the heat pulse, variations in characteristics of the heaters 102 can be adjusted by adjusting the heat pulse width.

Note that the ink ejection amount can also be adjusted by controlling the heat diffusion state due to the pre-heat pulse by adjusting the interval between the pre-heat pulse and the heat pulse.

As can be seen from the above description, the ink ejection amount can be controlled by adjusting the application times of the pre-heat pulse and the heat pulse, and can also be controlled by adjusting the application interval between the pre-heat pulse and the heat pulse. Therefore, by adjusting the application times of the pre-heat pulse and the heat pulse or the application interval between the pre-heat pulse and the heat pulse as needed, the ink ejection amount or response characteristics of ink ejection with respect to the applied pulse can be freely adjusted.

For example, a case will be explained below wherein ejection ports (nozzles) 108a, 108b, and 108c have different ink ejection amounts upon application of identical energy. More specifically, assume that upon application of constant energy at a constant temperature, the ink ejection amount of the nozzle 108a is 36 pl (picoliters), that of the nozzle 108b is 40 pl, and that of the nozzle 108c is 40 pl; and the resistances of heaters 102a and 102b with respect to the nozzles 108a and 108b are 200 Ω, and the resistance of a heater 102c with respect to the nozzle 108c is 210 Ω. Also, the ejection amounts of all the nozzles 108a, 108b, and 108c are to be adjusted to 40 pl.

In order to adjust the ejection amounts of the nozzles 108a, 108b, and 108c to the same amount, the pulse widths of pre-heat pulses and heat pulses need only be adjusted. However, various combinations of the pulse widths of pre-heat pulses and heat pulses are available. Hence, in this case, the energy amounts to be generated by the three nozzles (heaters) upon application of heat pulses are set to be equal to each other, and the ejection amounts are adjusted by adjusting the pulse widths of pre-heat pulses.

Since the resistances of the heaters 102a and 102b of the nozzles 108a and 108b are equal to each other, i.e., 200 Ω, voltage pulses having the same pulse width need only be applied to the heaters 102a and 102b to obtain the same energy amount upon application of heat pulses. In this case, the pulse width of the voltage pulse is set to be t3 larger than t5 described above. On the other hand, since the nozzles 108a and 108b have different ejection amounts, i.e., 36 pl and 40 pl upon application of identical energy, a pre-heat pulse of t2 larger than the pulse width, t1, of a pre-heat pulse to be applied to the heater 102b is applied to the heater 102a so as to increase the ejection amount of the nozzle 108a. In this manner, the ejection amounts of the nozzles 108a and 108b can be adjusted to an equal amount, i.e., 40 pl.

On the other hand, since the resistance of the heater 102c of the nozzle 108c is 210 Ω higher than those of the two remaining heaters 102a and 102b, the pulse width of the heat pulse must be increased to control the heater 102c to generate the same energy as that generated by the two remaining heaters. For this purpose, the pulse width of the heat pulse is set to be t4 larger than t3 above. The pulse width of a pre-heat pulse to be applied to the heater 102c can be set to be equal to that to be applied to the heater 102b since the nozzles 108b and 108c have the same ejection amount upon application of constant energy. Hence, a pre-heat pulse having a pulse width t1 is applied to the heater 102c.

In this manner, the three nozzles 108a, 108b, and 108c, which have different resistances and different ink ejection amounts upon application of constant pulses, can eject the same amount of ink. With the same technique, the ink ejection amounts may be intentionally differed. Note that the pre-heat pulse is used to eliminate variations in ejection amount in units of nozzles.

FIG. 13 is a block diagram showing the arrangement of the color filter manufacturing apparatus of this embodiment.

Referring to FIG. 13, an X-driving motor 56 and a Y-driving motor 58 are connected, via an X-motor driving circuit 52 and a Y-motor driving circuit 54, to a CPU 50 for controlling the operation of the overall manufacturing apparatus. Also, a Z-driving motor 59 for driving the recovery unit 30 in the Z-direction is connected to the CPU 50 via a Z-motor driving circuit 55.

Furthermore, the ink-jet head IJH is connected to the CPU 50 via a head driving circuit 60. Moreover, an X-encoder 62 and a Y-encoder 64 for detecting the position of the X-Y stage 22 are connected to the CPU 50, which receives position information of the X-Y stage 22 therefrom. Also, a control program in a program memory 66 is input to the CPU 50. The CPU 50 moves the X-Y stage 22 on the basis of the control program and the position information input from the X- and Y-encoders 62 and 64 to bring a desired grating frame (pixel) on the glass substrate 1 to a position below the ink-jet head IJH. The CPU 50 then controls the ink-jet head IJH to eject a desired color ink into the pixel so as to color it, thereby coloring the glass substrate 1. The CPU 50 repeats this operation for the respective pixels to manufacture a color filter. Every time the coloring operation of the glass substrate 1 has been completed, the recovery unit 30 attached to one end portion of the X-Y stage 22 is moved to a position immediately below the ink-jet head IJH, and a wiping operation is performed by the X-driving motor 56. On the other hand, a cap (not shown) is moved by the Z-driving motor 59 to perform a preliminary ejection operation. During this interval, a substrate convey device (not shown) replaces the colored glass substrate 1 by a non-colored glass substrate 1.

FIGS. 14A to 14D are views for explaining the way of using the nozzles of the ink-jet head IJH as a characteristic feature of this embodiment. As described above, the ink-jet head IJH comprises the red, green, and blue heads 120a, 120b, and 120c, and the way of using nozzles is basically common to these three heads. Hence, the way of using nozzles of the red head 120a will be exemplified in FIGS. 14A to 14D.

In FIG. 14A, the head 120a has nozzles n1, n2, n3, . . . which are separated by the same pitch (i.e., 70.5 μm: 360 dpi) as in a head used in a normal printer. In this case, the total number of nozzles is, e.g., 1,360. When a color filter is colored using a head for a normal printer, since the pitch between adjacent pixels of a color filter is about 300 μm, for example, nozzles, of the head 120a, that are separated by three nozzles are used to color pixels so as to adjust the pitch. More specifically, when a new head is used for the first time, pixels are colored using nozzles n1, n5, n9, . . . , as shown in FIG. 14A. In this embodiment, the number of nozzles used upon coloring a single color filter is ¼ the total number of nozzles. Note that it is a common practice to slightly tilt the ink-jet head in the θ direction shown in FIG. 14A, so as to accurately adjust the pitch of nozzles to that of the pixels of a color filter.

Assume that the first nozzle group is constituted by nozzles n1, n5, n9, . . . , the second nozzle group is constituted by nozzles n2, n6, n10, . . . , the third nozzle group is constituted by nozzles n3, n7, n11, . . . , and the fourth nozzle group is constituted by n4, n8, n12, . . . . When a new head is used for the first time, a color filter is colored using, e.g., the first nozzle group. When the first nozzle group has completed the coloring operations for a prescribed number of color filters or has been used for a prescribed period of time, and the service life of the first nozzle group has expired, the nozzle group to be used is switched to the second and third nozzle groups in turn to perform the coloring operations of color filters. In the head of this embodiment, the service life of each nozzle group expires after ejection of about two hundred million ink dots, and the nozzle groups are switched with reference to this value. The switching timing is determined by the CPU 50 in FIG. 13 by counting the number of ejections. Alternatively, ejection errors of nozzles may be actually detected, and the end of the service life may be determined upon detection of ejection errors.

In the manufacture of a color filter, the precision of the amount of ink per ejection has a very large influence on the quality of a completed color filter. If the nozzles of the ink-jet head suffer variations in ejection amount, color nonuniformity of the color filter is generated. For this reason, in the manufacture of a color filter, the ejection amounts of nozzles must be adjusted to minimize variations in ejection amount. Conventionally, such adjustment is attained by setting the ejection amounts of all the nozzles (1,360 nozzles in this embodiment) of the ink-jet head to become close to a given constant value (e.g., the average value of the ejection amounts of all the nozzles). However, as has already been described above, since the number of nozzles used for manufacturing a single color filter is about ¼ the total number of nozzles in this embodiment, the average value calculated by sampling the ejection amounts of all the nozzles includes as data information of the ejection amounts of nozzles other than those to be actually used. For this reason, the adjustment precision of the ejection amounts is impaired due to the influence of irrelevant data.

In view of this problem, in this embodiment, the ink ejection amounts are adjusted on the basis of ejection amount data of only nozzles actually used for coloring a single color filter. For example, when the nozzle group to be used is the first nozzle group, the ejection amounts of only nozzles n1, n5, n9, . . . belonging to the first nozzle group are adjusted based on their ejection amount data under a pre-determined condition, so as to minimize variations in ejection amount of these nozzles. The ejection amount data under the predetermined condition of nozzles of each nozzle group are obtained in advance by actually measuring the ejection amounts of nozzles in the final inspection in the manufacture of an ink-jet head. These data are pre-stored in a memory in the CPU 50 shown in FIG. 13. Based on the ejection amount data, the CPU 50 adjusts the driving pulses shown in FIG. 12 for each nozzle to minimize variations in ejection amounts of nozzles belonging to one nozzle group.

As an example of the variation elimination method, the ejection amounts may be adjusted to minimize the difference between the ejection amounts of neighboring nozzles in one nozzle group. More specifically, when the first nozzle group is used, the difference between the ejection amounts of neighboring nozzles, e.g., the difference between the ejection amounts of nozzles n1 and n5, the difference between the ejection amounts of nozzles n5 and n9, . . . , are minimized. If density nonuniformity between neighboring pixels is negligibly small upon observation of a color filter, a person does not sense the presence of nonuniformity even when density nonuniformity between pixels separated by a large distance is relatively large. For this reason, it is effective to minimize the difference between the ejection amounts of neighboring nozzles.

Alternatively, the average value of the ejection amounts of all the nozzles in one nozzle group may be calculated, and the ejection amounts of the nozzles may be adjusted to become close to the average value. In this way, a color filter which apparently suffers less color nonuniformity can be manufactured.

As described above, according to the above embodiment, the nozzles of an ink-jet head are divided into a plurality of nozzle groups, and the ejection amounts of nozzles are adjusted in units of nozzle groups to minimize variations in ejection amount, thus allowing the manufacture of a color filter which apparently suffers less color nonuniformity.

In this embodiment, the ink-jet head comprises a bubble-jet type ink-jet head in which ink on each heater 102 is boiled and forms a bubble, and the ink is pushed out and ejected from the corresponding ejection port 108 due to the volume expansion of the bubble. However, the present invention is not limited to this type of head. For example, an ink-jet head using piezoelectric elements may be used.

In the above embodiment, the present invention is applied to the manufacture of a color filter. However, the present invention is not limited to the manufacture of a color filter, but may be applied to any other applications as long as a drawing operation is performed using only some nozzles of an ink-jet head.

The present invention has exemplified a printer apparatus, which comprises means (e.g., an electro-thermal conversion element, laser beam, and the like) for generating heat energy as energy utilized upon execution of ink ejection, and causes a change in state of ink by the heat energy, among the ink-jet recording systems. According to this system, a high-density, high-definition recording operation can be attained.

As the representative arrangement and principle of the ink-jet recording system, one practiced by use of the basic principle disclosed in, for example, U.S. Pat. Nos. 4,723,129 and 4,740,796 is preferred. The above system is applicable to either one of a so-called on-demand type and continuous type. Particularly, in the case of the on-demand type, the system is effective because, by applying at least one driving signal, which corresponds to recording information and gives a rapid temperature rise exceeding nucleate boiling, to each of electro-thermal conversion elements arranged in correspondence with a sheet or liquid channels holding a liquid (ink), heat energy is generated by the electro-thermal conversion element to effect film boiling on the heat acting surface of the recording head, and consequently, a bubble can be formed in the liquid (ink) in one-to-one correspondence with the driving signal. By ejecting the liquid (ink) through an ejection port by growth and shrinkage of the bubble, at least one droplet is formed. If the driving signal is applied as a pulse signal, the growth and shrinkage of the bubble can be attained instantly and adequately to achieve ejection of the liquid (ink) with particularly high response characteristics.

As the pulse driving signal, signals disclosed in U.S. Pat. Nos. 4,463,359 and 4,345,262 are suitable. Note that further excellent recording can be performed by using the conditions described in U.S. Pat. No. 4,313,124 of the invention which relates to the temperature rise rate of the heat acting surface.

As the arrangement of the recording head, in addition to the arrangement as a combination of ejection ports, liquid channels, and electro-thermal conversion elements (linear liquid channels or right-angled liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses an arrangement using a slit common to a plurality of electro-thermal conversion elements as an ejection portion of the electro-thermal conversion elements, or Japanese Patent Laid-Open No. 59-138461 which discloses an arrangement having an opening for absorbing a pressure wave of heat energy in correspondence with an ejection portion.

Furthermore, as a full line type recording head having a length corresponding to the width of a maximum recording medium which can be printed by the recording apparatus, either the arrangement which satisfies the full-line length by combining a plurality of recording heads as disclosed in the above specification or the arrangement as a single recording head obtained by forming recording heads integrally can be used.

In addition, the present invention is effective for a case using an exchangeable chip type recording head which can be electrically connected to the apparatus main body or can receive ink from the apparatus main body upon being mounted on the apparatus main body, or a cartridge type recording head in which an ink tank is integrally arranged on the recording head itself.

It is preferable to add recovery means for the recording head, preliminary auxiliary means, and the like provided as an arrangement of the print apparatus of the present invention since the effect of the present invention can be further stabilized. Examples of such means include, for the recording head, capping means, cleaning means, pressurization or suction means, and preliminary heating means using electro-thermal conversion elements, another heating element, or a combination thereof. It is also effective for stable recording to execute a preliminary ejection mode which performs ejection independently of recording.

Moreover, in the above-mentioned embodiment, ink is described as a liquid. Alternatively, the present invention may use even ink which is solid at room temperature or less and softens or liquefies at room temperature as long as the ink liquefies upon application of a use recording signal.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, the present invention can be applied to a case wherein ink which liquefies upon application of heat energy, such as ink which liquefies upon application of heat energy according to a recording signal and is ejected in a liquid state, ink which begins to solidify when it reaches a recording medium, or the like, is used. In this case, ink may oppose electro-thermal conversion elements while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

As described above, according to the ink-jet drawing method and apparatus of the present invention, when a drawing operation is performed using only some of a plurality of ejection nozzles, the ejection amounts of the nozzles to be used can be made uniform with high precision.

The present invention is not limited to the above embodiments and various changes and modifications can be made within the spirit and scope of the present invention. Therefore, to apprise the public of the scope of the present invention the following claims are made.

What is claimed is:

1. An ink-jet printing method comprising the steps of:

dividing all nozzles of an ink-jet head having a plurality of ink ejection nozzles into a plurality of nozzle groups, each including nozzles separated by a predetermined number of nozzles;

performing a printing operation by switching the plurality of nozzle groups such that a plurality of nozzles of selected nozzle group or groups are driven simultaneously to eject ink and a plurality of nozzles of non-selected group or groups are not driven; and making uniform any variations in ink amount ejected, in said printing operation performing step, from each of the nozzles driven simultaneously on a unit area of a medium to be colored based on information of ink amount ejected from each of the nozzles driven simultaneously that belong to the selected nozzle group or groups.

2. The method according to claim 1, wherein in said step of making uniform, the ink amounts ejected from the nozzles in each nozzle group are made uniform, so that a difference between the ink amounts ejecting from neighboring nozzles in the nozzle group is minimized.

3. The method according to claim 1, wherein in said step of making uniform, the ink amounts ejected from the nozzles in each nozzle group are made uniform based on an average value of the ink amounts ejected from the nozzles in each nozzle group under a predetermined condition, so that a difference between the ink amount ejected from each nozzle and the average value is minimized.

4. The method according to claim 1, wherein in said printing operation performing step, said ink-jet head ejects ink by utilizing heat energy, and comprises a heat energy generation member for generating heat energy to be applied to the ink.

5. An ink-jet printing apparatus comprising:

first control means for dividing all nozzles of an ink-jet head having a plurality of ink ejection nozzles into a plurality of nozzle groups, each including nozzles separated by a predetermined number of nozzles, and performing a printing operation by switching the plurality of nozzle groups such that a plurality of nozzles of selected nozzle group or groups are driven simultaneously to eject ink and a plurality of nozzles of non-selected group or groups are not driven;

storage means for pre-storing ejection amount data of all nozzles of said ink-jet head under a predetermined condition, the ejection amount data being based on information of ink amounts ejected from each of the nozzles driven simultaneously that belong to the selected nozzle group or groups; and second control means for independently making uniform any variations in ink amounts ejected from the nozzles for each of the plurality of nozzle groups on the basis of the ejection amount data stored in said storage means.

6. The apparatus according to claim 5, wherein the ink amounts ejected from the nozzles in each nozzle group are made uniform, so that a difference between the ink amounts ejected from neighboring nozzles in the nozzle group is minimized.

7. The apparatus according to claim 5, wherein the ink amounts ejected from the nozzles in each nozzle group are made uniform on the basis of an average value of the ink amounts ejected from the nozzles in each nozzle group under the predetermined condition, so that a difference between the ink amount ejected from each nozzle and the average value is minimized.

8. The apparatus according to claim 5, further comprising said ink let head, wherein said ink-jet head ejects ink by utilizing heat energy, and comprises a heat energy generation member for generating heat energy to be applied to the ink.

9. A method of manufacturing a color filter by coloring a color filter substrate, said method comprising the steps of:

dividing all nozzles of an ink-jet head having a plurality of ink ejection nozzles into a plurality of nozzle groups, each including nozzles separated by a predetermined number of nozzles;

performing a printing operation by switching the plurality of nozzle groups such that a plurality of nozzles of selected nozzle group or groups are driven simultaneously to eject ink and a plurality of nozzles of non-selected group or groups are not driven; and making uniform any variations in ink amount ejected, in said printing operation performing step, from each of the nozzles driven simultaneously on a unit area of a medium to be colored based on information of ink amount ejected from each of the nozzles driven simultaneously that belong to the selected nozzle group or groups.

10. The method according to claim 9, wherein said color filter substrate is colored in said printing operation performing step by using one of the plurality of nozzle groups of said ink-jet head, said method further comprising the step of switching said one nozzle group to be used for coloring to another nozzle group when an abnormality occurs in nozzles of said one nozzle group.

11. The method according to claim 9, wherein in said printing operation performing step, said ink-jet head ejects ink by utilizing heat energy, and comprises a heat energy generation member for generating heat energy to be applied to the ink.

12. A color filter manufacturing apparatus comprising:

first control means for coloring a color filter substrate by dividing all nozzles of an ink-jet head having a plurality of ink ejection nozzles into a plurality of nozzle groups, each including nozzles separated by a predetermined number of nozzles, and performing a printing operation by switching the plurality of nozzle groups such that a plurality of nozzles of selected nozzle group or groups are driven simultaneously to eject ink and a plurality of nozzles of non-selected group or groups are not driven;

storage means for pre-storing ejection amount data of all nozzles of said ink-jet head under a predetermined condition, the ejection amount data being based on information of ink amounts ejected from each of the nozzles driven simultaneously that belong to the selected nozzle group or groups; and second control means for independently making uniform any variations in ink amounts ejected from the nozzles for each of the plurality of nozzle groups on the basis of the ejection amount data stored in said storage means.

13. The apparatus according to claim 12, wherein said color filter substrate is colored using one of the plurality of nozzle groups of said ink-jet head, and said one nozzle group to be used for coloring is switched to another nozzle group when an abnormality occurs in nozzles of said one nozzle group.

14. The apparatus according to claim 12, further comprising said ink let head, wherein said ink-jet head ejects ink by utilizing heat energy, and comprises a heat energy generation member for generating heat energy to be applied to the ink.

* * * * *

UNITED STATES PATENT AND TRADEMARK OFFICE
CERTIFICATE OF CORRECTION

PATENT NO.   : 5,847,723
DATED        : December 8, 1998
INVENTOR(S)  : AKAHIRA ET AL.

It is certified that error appears in the above-indentified patent and that said Letters Patent is hereby corrected as shown below:

Title page, item

[56] References Cited:

FOREIGN PRIORITY DOCUMENTS,

"0 044 492" should read --0 440 492--.

UNITED STATES PATENT AND TRADEMARK OFFICE
CERTIFICATE OF CORRECTION

PATENT NO. : 5,847,723
DATED : December 8, 1998
INVENTOR(S) : AKAHIRA ET AL.

It is certified that error appears in the above-identified patent and that said Letters Patent is hereby corrected as shown below:

Title page, item
[57] ABSTRACT:
    Line 2, "make" should read --can make--.

COLUMN 4:
    Line 53, "light." should be read --light--.

COLUMN 18:
    Line 6, "ink let" should read --ink-jet--.

Signed and Sealed this

Twenty-fourth Day of August, 1999

Attest:

Q. TODD DICKINSON

*Attesting Officer*      *Acting Commissioner of Patents and Trademarks*